UNITED STATES PATENT OFFICE.

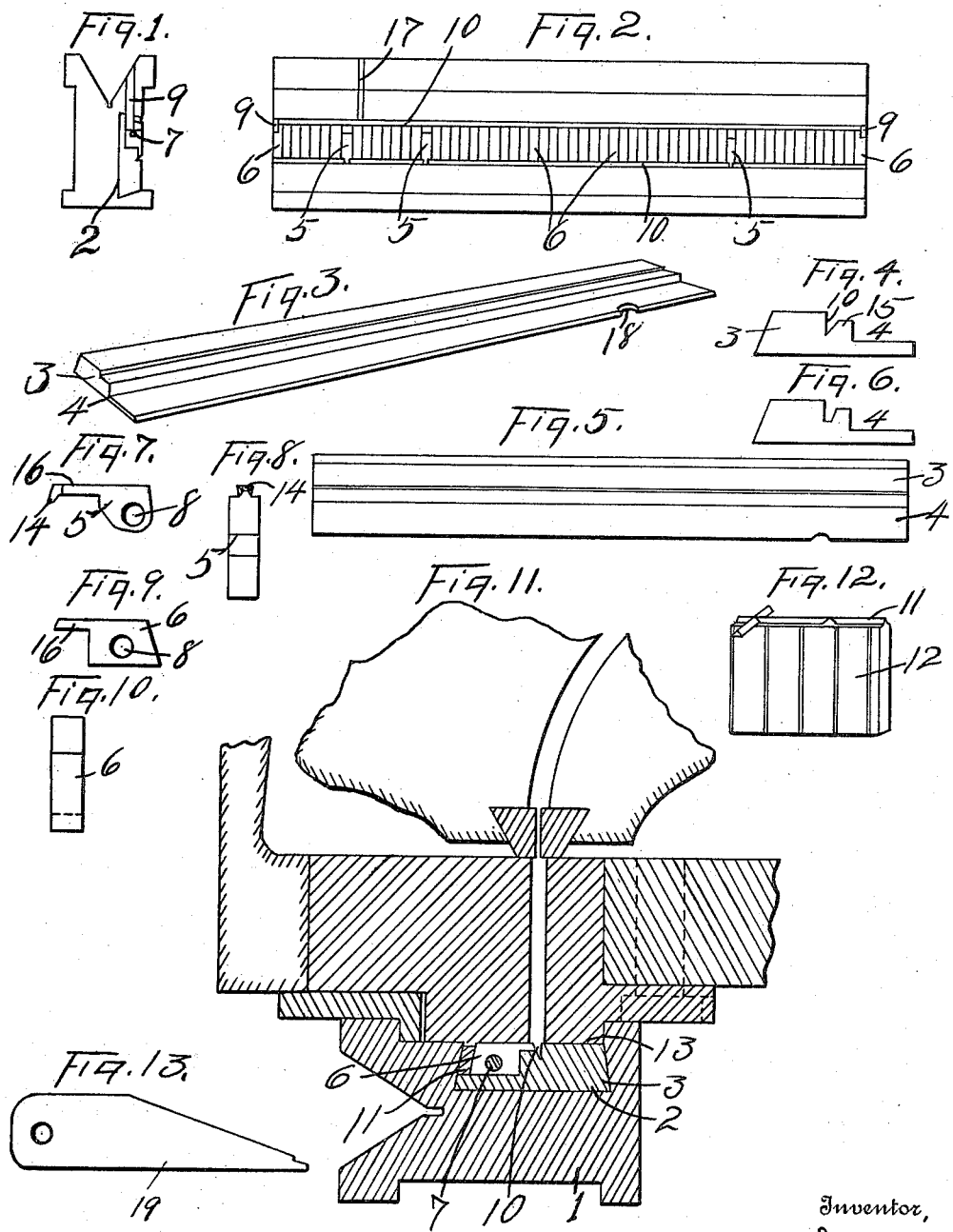

ANDREW E. MARKWELL, OF FORT WORTH, TEXAS, ASSIGNOR TO A. D. EVANS, OF FORT WORTH, TEXAS.

MATRIX MOLDING DEVICE.

1,226,556.  Specification of Letters Patent.  Patented May 15, 1917.

Application filed August 14, 1916.  Serial No. 114,745.

*To all whom it may concern:*

Be it known that I, ANDREW E. MARKWELL, a citizen of the United States, residing at Fort Worth, in the county of Tarrant and State of Texas, have invented certain new and useful Improvements in Matrix Molding Devices, of which the following is a specification.

My invention relates to matrix molding devices for use in linotype or intertype or line casting machines for molding printers' slugs, and the object is to provide devices by which type high printing slugs may be molded with printing surfaces of various designs formed on the edges of the slugs for ruled forms and by which openings through the beveled faces of the slugs may be formed for insertion of rules for forming continuous horizontal lines from vertical rule to vertical rule without apparent breaks in the lines at the crossings and particularly to provide devices for molding printers' slugs with smooth surfaces formed on the beveled faces of the slugs and smooth printing edges. The object is to provide devices by which high class or artistic printing may be accomplished. Other objects and advantages will be fully explained in the following description and the invention will be more particularly pointed out in the claims.

Reference is had to the accompanying drawings which form a part of this application.

Figure 1 is an end view of a matrix molding block. Fig. 2 is a plan view of the same. Fig. 3 is a perspective view of one of the forming slides. Fig. 4 is an end view and Fig. 5 is a plan view of the same. Fig. 6 is an end view of a slide which varies slightly from the slide of Fig. 4. Fig. 7 is a side elevation of one of the formers. Fig. 8 is an inverted view of the same. Fig. 9 is a side elevation of one of the spacing members or a point-set segment. Fig. 10 is a plan view of the same. Fig. 11 is a vertical cross-section of the molding block and slide and a side elevation of a point-set segment. Fig. 12 is a perspective view of a slug which is formed by the devices herein set forth, showing how a rule is inserted in the beveled portion of the slug.

Similar characters of reference are used to indicate the parts throughout the several views.

The molding and forming devices are carried in a block 1 which has a groove 2 longitudinally in one face and this groove has undercut-edges. A slide 3 having beveled edges to conform with the contour of the groove 2 is mounted in the block 1. The slide 3 has an angular cut-out 4 for the forming devices. The forming devices consist of the formers 5 and the point-set segments 6 or spacing devices which are mounted in the angular cut-out in the slide 3. The point-set formers 5 and the point-set segments 6 are perforated so that a retaining rod or needle 7 can be run through the perforations 8 for retaining formers and segments in place. Guard members 9 are embedded in the block 1 and project partly across the groove 2 to prevent the formers 5 and segments 6 from falling out of the end of the block, the segments 6 next to the end of the block 1 having notches to receive the ends of the guard members 9. The segments 6 and the formers 5 are further locked in place and lined by a bar 11 which runs longitudinally in the groove 2 and bears against the ends of the segments 6 and formers 5 and holds the same in alinement and locks them in place. When a row of segments or spacers 6 are placed in the block 1 and slide 3, they form an angular groove 10 which forms a part of the beveled portion 11 of the slug 12 on the rib side thereof. The upper surfaces of the segments 6 are flush with the top surface 13 of the slide 3. The slug mold will be positioned on the slide 3 and segments 6, as shown in Fig. 11. The angular groove 10 in the slide 3 extends lower in the slide than the adjacent portions of the spacers 6. This is the construction which forms the smooth edge of the slug. The groove is formed partly in the slide and partly between the spacers and a portion of the slide. This makes provision for the formers 5 which are somewhat similar in contour to the spacers or segments 6. The formers occupy the same groove formed by the slide and the holding bar 11 and the same stepped portion 15 of the slide. But the formers are interposed between the spacers and are held in place by the rod 7. The spacers are held rigidly in place while the formers 5 will swing on the rod 7 so that when the slug is withdrawn from the slide 3, the hole forming tips 14 will easily draw out of the beveled portion of the slug. The hole forming tips 14 project down in the grooves 10 to form the triangular opening in the beveled face of the slug. The stepped portion 15 of the slide forms a support for the shank portions 16 of the formers 5 and of the segment spacers 6. The formers 5 can be taken out and moved from place to place in the groove in the slide by withdrawing the rod 7. The spacers 6 cannot be removed without taking out the bar 11 but they can be shifted for the purpose of locating the formers 5. In order to make the adjustments of the spacers 6 and the bar 11, a slot 17 is cut in the block 1 and a notch 18 is cut in the slide 3 so that a key 19, shown in Fig. 13, may be projected under the bar 11 to lift the same out of the block 1.

The stepped portion 15 of the slide 3 may have any desirable groove or cavity formed therein for making a printing surface on the slug. In Fig. 6, the groove in the slide is made wide enough to make or mold a slug which will print a heavy line.

What I claim is,—

1. A matrix molding block having a groove therein, a slug-surface forming slide mounted therein having an angular cut-out and a stepped surface and having an angular groove in said stepped surface, spacing members mounted in said angular cut-out and having shank portions resting on the stepped portion of said slide, a bar for alining and locking said spacing members, and formers interposed between said spacing members and having shank portions resting on said stepped portion and having hole-forming tips projecting down in said groove.

2. Matrix molding devices comprising a block having a groove therein, a slug-surface forming slide mounted in said groove and having angular cavities therein, spacing members and formers mounted in said cavities, means for locking said spacing members in said slide and block, and hole-forming tips on said formers projecting down into one of the angular cavities of said slide.

3. Matrix molding devices comprising a block having a groove therein, a slug-surface forming slide mounted in said groove and provided with an angular cut-out and an angular groove therein, spacing members mounted in said cut-out, and formers interposed between said spacing members and having hole-forming tips projecting down into said groove.

4. Matrix molding devices comprising a block having a longitudinal groove therein, a slug-surface forming slide mounted in said groove and provided with an angular cut-out and an angular surface-forming groove therein, spacing members having body portions mounted in said cut-out and having shank portions extending to said groove, and formers having body portions interposed at selective intervals between spacing members and shank-portions extending to said groove and tips projecting down into said groove.

5. Matrix molding devices comprising a block having a longitudinal groove therein, a slug-surface forming slide mounted in said groove and provided with an angular cut-out and an angular surface forming groove therein, spacing members having body portions mounted in said angular cut-out and shank portions extending to said groove and having alined perforations in said body portions, a rod running through said body portions, and formers pivotally mounted on said rod at selective intervals between said spacing members and having shank portions extending to said groove and hole-forming tips on said shank portions extending down into said groove.

6. Matrix molding devices comprising a block having a longitudinal groove therein, a slug-surface forming slide mounted in said groove and provided with an angular cut-out and an angular surface-forming groove therein, spacing members having body portions mounted in said cut-out and having shank portions extending to said groove and increasing the depth of said groove, a bar for alining said body portions and bearing against said block for locking said spacing members in place, and formers interposed at selective intervals between said spacing members and having shank portions extending to said groove and hole-forming tips on said shanks extending down into said groove.

In testimony whereof, I set my hand, this 9th day of August, 1916.

ANDREW E. MARKWELL.

Copies of this patent may be obtained for five cents each, by addressing the "Commissioner of Patents. Washington, D. C."